United States Patent
Yamaguchi

(10) Patent No.: US 7,912,622 B2
(45) Date of Patent: Mar. 22, 2011

(54) FUEL INJECTION AMOUNT LEARNING CONTROL METHOD

(75) Inventor: Kazumi Yamaguchi, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 349 days.

(21) Appl. No.: 12/161,360

(22) PCT Filed: Dec. 8, 2006

(86) PCT No.: PCT/JP2006/324563
§ 371 (c)(1), (2), (4) Date: Jul. 18, 2008

(87) PCT Pub. No.: WO2007/086199
PCT Pub. Date: Aug. 2, 2007

(65) Prior Publication Data
US 2010/0057326 A1 Mar. 4, 2010

(30) Foreign Application Priority Data
Jan. 24, 2006 (JP) .................................. 2006-015130

(51) Int. Cl.
*F02D 41/30* (2006.01)
*G06F 7/76* (2006.01)
*F02D 41/14* (2006.01)

(52) U.S. Cl. ...................................... 701/103; 123/674

(58) Field of Classification Search .......... 701/103–105; 123/674, 492, 491, 480, 672, 675
See application file for complete search history.

(56) References Cited

U.S. PATENT DOCUMENTS

| | | | |
|---|---|---|---|
| 4,571,683 A * | 2/1986 | Kobayashi et al. | 123/674 |
| 5,934,248 A | 8/1999 | Toyoda | |
| 6,014,962 A * | 1/2000 | Sato et al. | 123/674 |

FOREIGN PATENT DOCUMENTS

| | | |
|---|---|---|
| EP | 1375888 A2 | 2/2004 |
| JP | 59190433 | 10/1984 |

(Continued)

OTHER PUBLICATIONS

Supplementary European Search Report for EP Application No. 06 83 4318 dated Feb. 26, 2010.

(Continued)

*Primary Examiner* — Hieu T Vo
(74) *Attorney, Agent, or Firm* — McCormick, Paulding & Huber LLP

(57) ABSTRACT

A fuel injection amount learning and controlling method capable of learning the amount of fuel injection independent of whether accessories are operated or not and without being affected by environmental conditions such as coolant temperature. The fuel injection amount learning and controlling method obtains, using an idle injection amount standard value as the standard, a fuel injection amount learning value so that the speed of an internal combustion engine (1) is a target idle speed. The method has a learning correction function that obtains in advance a relationship between load by accessories (3, 4) driven by the engine (1) and a fuel injection incremental amount that is due to the load imposed by the accessories (3, 4) and is relative to a no-load condition as the standard. To obtain the fuel amount learning value, the learning correction function measures the load by the accessories (3,4), derives a fuel injection incremental amount relative to the measured load, and corrects the idle injection amount standard value by using he incremental amount.

5 Claims, 2 Drawing Sheets

FOREIGN PATENT DOCUMENTS

| | | | |
|---|---|---|---|
| JP | 11-36953 A * | 2/1999 |
| JP | 11-173191 A1 | 6/1999 |
| JP | 2001-098986 A1 | 4/2001 |
| JP | 2003-254139 A1 | 9/2003 |
| JP | 2004-011511 A1 | 1/2004 |

OTHER PUBLICATIONS

International Search Report for PCT/JP2006/324563 dated Feb. 27, 2007.

* cited by examiner

FUEL INJECTION AMOUNT LEARNING CONTROL METHOD

CROSS REFERENCE TO RELATED APPLICATIONS

This application is entitled to the benefit of and incorporates by reference essential subject matter disclosed in International Patent Application No. PCT/JP2006/324563 filed on Dec. 8, 2006 and Japanese Patent Application No. 2006-015130 filed Jan. 24, 2006.

TECHNICAL FIELD

The present invention relates to a method for learning control of the fuel injection amount of an engine.

BACKGROUND ART

Conventionally, a learning control of fuel injection amount is performed after a vehicle was assembled or after the vehicle was shipped, in order to correct a variation (dispersion) in the fuel injection amount of an engine.

Such learning control method is disclosed, for example, in Japanese Patent Application Laid-open No. 2004-11511. Such learning control method involves finding an idle fuel injection amount (for example, 5 mm$^3$) by taking into account the life cycle of a vehicle or a variation of amount in each vehicles, and reading this idle fuel injection amount in an engine control unit in advance, before learning control of the fuel injection amount is started. The engine is then operated in an idle mode and learning of the fuel injection amount is started. Where the engine speed is higher than the idle speed (for example, 800 rpm) during this learning, a learning value (for example, a fuel injection period correction value) is subtracted and a learning value at a time the idle speed is assumed is saved in the engine control unit as "a learning completion value at which the idle injection amount is correctly injected".

DISCLOSURE OF THE INVENTION

However, the problem associated with the above-described learning control method is that when automatic learning is to be performed on the engine while in use by the consumer after the engine has been shipped, the learning is not performed during the operation of auxiliary devices such as an air conditioner. In other words, because a condition of "friction at a time the idle speed (for example, 800 rpm) has been stabilized does not change" has to be satisfied during learning, the correct learning can be conducted only in a state in which an air conditioner or the like is turned off. As a result, automatic learning is impossible unless the user has turned off the air conditioner. Accordingly, conducting the learning after the air conditioner has been forcibly switched off can be suggested, but the problem associated with such approach is that because the air conditioner is suddenly turned off, regardless of the air conditioning state, the air conditioner function is degraded.

Further, the engine friction also varies not only depending on whether the auxiliary devices are turned on or off, but also under the effect of cooling water temperature. Therefore, another problem is that the learning of fuel injection amount is not conducted correctly also because of environmental conditions such as a cooling water temperature.

Accordingly, it is an object of the present invention to resolve the above-described problems and to provide a fuel injection amount learning control method that can perform learning of a fuel injection amount, regardless of whether the auxiliary devices are turned on or off and without being affected by environmental conditions such as a cooling water temperature.

In order to attain the above-described object, the present invention provides a fuel injection amount learning control method having a learning function of finding in advance a friction of an internal combustion engine, determining an idle injection amount reference value by taking the friction into account, and finding a fuel injection amount learning value such that a speed of the internal combustion engine becomes a target idle speed with reference to the determined idle injection amount reference value, the method having a learning correction function of: finding in advance a relationship between a load created by an auxiliary device driven by the internal combustion engine and an increment of a fuel injection amount by the load of the auxiliary device relative to a state without a load; and correcting the idle injection amount reference value by the increment in the fuel injection amount corresponding to the load of the auxiliary device when the fuel injection amount learning value is found.

In order to attain the above-described object, the present invention provides a fuel injection amount learning control method having a learning function of finding in advance a friction of an internal combustion engine, determining an idle injection amount reference value by taking the friction into account, and finding a fuel injection amount learning value such that a speed of the internal combustion engine becomes a target idle speed with reference to the determined idle injection amount reference value, the method having a learning correction function of: finding in advance a relationship between an environmental condition such as a cooling water temperature of the internal combustion engine and a variation in a fuel injection amount under the environmental condition relative to a reference environmental condition; and measuring the environmental condition and correcting the idle injection amount reference value by the variation in the fuel injection amount corresponding to the measured environmental condition when the fuel injection amount learning value is found.

Preferably, the step of finding a fuel injection amount learning value includes the steps of injecting the fuel corresponding to the idle injection amount reference value by portions in a plurality of injections to find the injection amount learning value.

In order to attain the above-described object, the present invention provides a fuel injection amount learning control method having a learning function of finding a fuel injection amount learning value such that a speed of an internal combustion engine becomes a target idle speed with reference to a predetermined idle injection amount reference value, the method having a learning correction function of correcting the idle injection amount reference value in accordance with a load of an auxiliary device driven by the internal combustion engine when the fuel injection amount learning value is found.

The present invention demonstrates an excellent effect of enabling the learning of a fuel injection amount, regardless of whether the auxiliary devices are turned on or off and without being affected by environmental conditions such as a cooling water temperature.

BEST MODE FOR CARRYING OUT THE INVENTION

A preferred embodiment of the present invention will be described below with reference to the appended drawings.

The fuel injection amount learning control method of the present embodiment is applied, for example, to a diesel engine of a vehicle.

First, a schematic structure of the engine of the present invention will be described based on FIG. 2.

Figure 2:
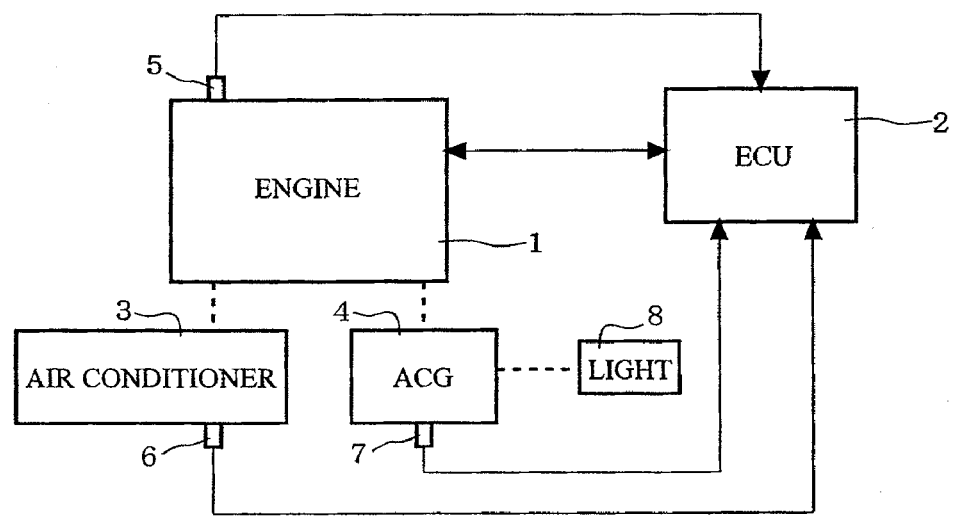
FIG. 2 is a schematic structural view of an engine and an auxiliary device of the present embodiment.

As shown in FIG. 2, an engine (internal combustion engine) 1 of a vehicle is communicably connected to an engine control unit (referred to hereinbelow as ECU) 2 serving to control the engine 1. Further, auxiliary devices 3, 4 such as an air conditioner 3 and power generator (referred to hereinbelow as ACG) 4 provided on the vehicle are driven by the engine 1. The ACG 4 is connected to supply electric power to a light 8 and the like.

The ECU 2 is connected to an injector (not shown in the figure) of the engine 1 and regulates the fuel injection amount of the engine 1 by opening and closing the injector. More specifically, the ECU 2 transmits to the injector a predetermined fuel injection pulse for ON-OFF controlling the electric conduction time to the injector, thereby opening and closing the injector.

A variety of sensors such as a water temperature sensor 5 for detecting the cooling water temperature of the engine 1, an air conditioner load detection means 6 for detecting the operation state of the air conditioner 3, an ACG load detection means (for specifically, an F terminal of the ACG 4) 7 for detecting the operation state of the ACG 4, and an engine speed sensor (not shown in the figure) are connected to the ECU 2, and the detection signals thereof are inputted therein.

The ECU 2 is provided with a storage means (not shown in the figure) for storing the below-described idle injection amount reference value, fuel injection amount correction value, and Table of Correction Values.

The fuel injection amount learning control method of the present embodiment will be described below with reference to FIG. 2.

The fuel injection amount learning control method of the present embodiment has a learning function of finding in advance a friction of the engine 1, determining an idle injection amount reference value by taking the friction into account, and finding a fuel injection amount learning value such that a speed of the engine 1 becomes a target idle speed with reference to the determined idle injection amount reference value.

However, where the auxiliary devices 3, 4 operate, a power necessary to operate them acts as a load upon the engine 1. Thus, even if the fuel injection amount is the same, when the auxiliary devices 3, 4 operate, the engine speed decreases correspondingly to the load of the auxiliary devices 3, 4. Therefore, when the auxiliary devices 3, 4 operate, the fuel injection amount learning (idle learning) has to be conducted by taking into account the load created by the auxiliary devices 3, 4.

Accordingly, in the present embodiment, during idle learning the idle injection amount reference value (for example, 5 $mm^3$) that has been written in advance into the ECU 2 is taken such that it enables the addition of a correction value corresponding to a load of the air conditioner 3 or the like, so that the injection amount learning can be conducted even in the state in which the load of the air conditioner 3 or the like is applied. In other words, the idle injection amount reference value during learning is taken as a value to which the load correction has been added with consideration for the load created by the air conditioner 3, ACG 4, and the like.

The fuel injection amount learning control method of the present embodiment has a learning correction function of finding in advance a relationship between a load created by the auxiliary devices 3, 4 driven by the engine 1 and an increment of a fuel injection amount corresponding to the load of the auxiliary devices 3, 4 relative to a state without a load, and correcting the idle injection amount reference value by the increment in the fuel injection amount corresponding to the load of the auxiliary devices 3, 4 when the fuel injection amount learning value is found. With such learning correction function, the idle injection amount reference value is corrected for the load created by the auxiliary devices driven by the internal combustion engine.

Further, with the fuel injection amount learning control method, first, when a load of an air conditioner 3 or the like is applied, the amount of extra fuel ($mm^3$) which is to be injected to maintain the target engine speed is found in advance, and then when idle learning is performed, the increment of the fuel injection amount corresponding to the operation state of the air conditioner 3 or the like is added as a correction value to the idle injection amount reference value (learning correction function).

An example of the fuel injection amount learning control method will be explained below with reference to FIG. 1 and FIG. 3.

For example, when the load caused by the air conditioner 3 is corrected, a relationship between the air conditioner pressure and the increment of fuel injection amount is found in advance, and a "Table of Injection Amount Reference Values During Idle Learning and Air Conditioner Load Correction Values" (referred to hereinbelow as "Table of Correction Values") in which the air conditioner pressure serves as an axis (parameter) is created. This table is stored in the ECU 2 in advance, for example, before the vehicle is shipped.

Figure 3:
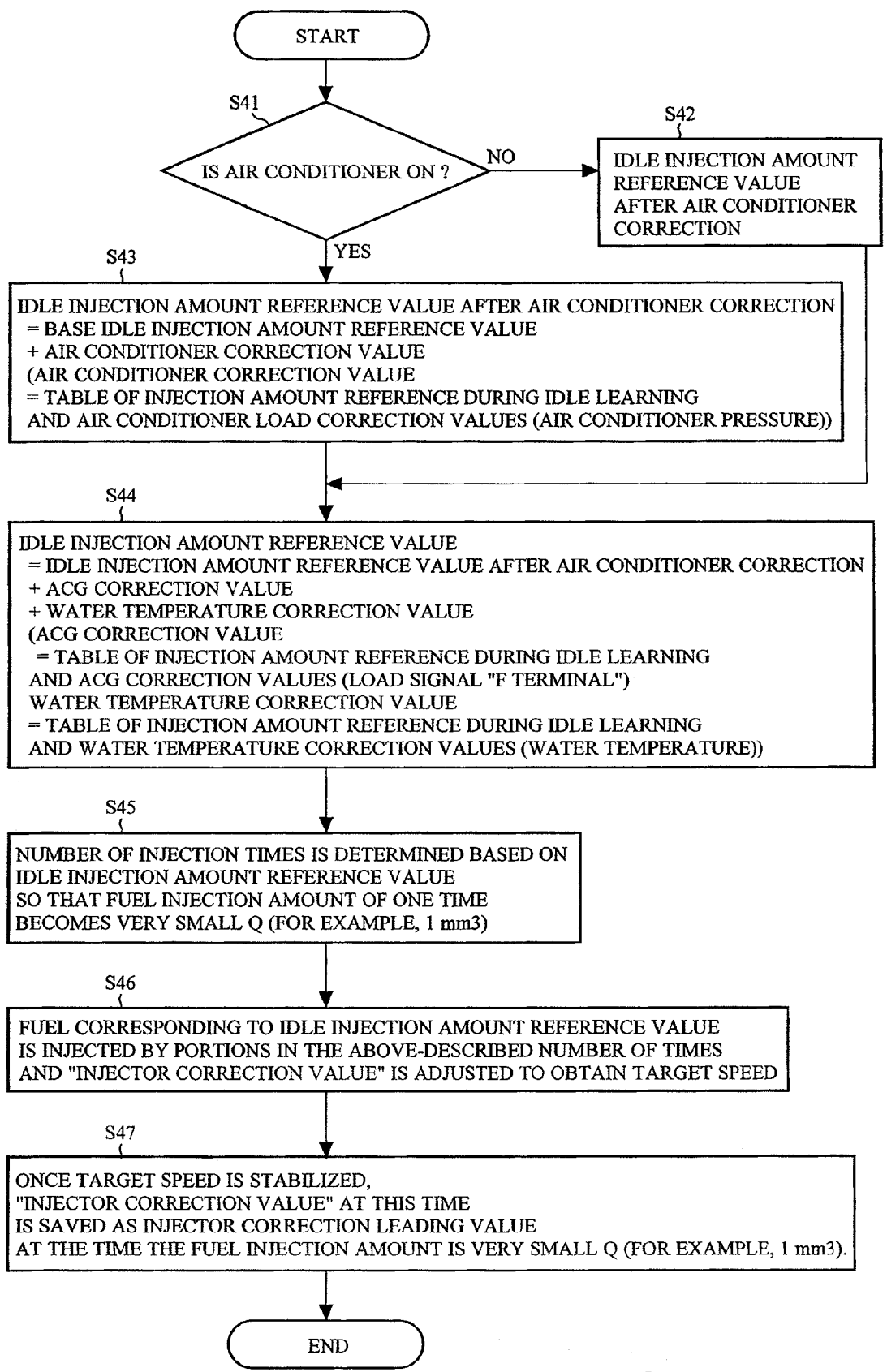
FIG. 3 is a flowchart for the fuel injection amount learning control method of the present embodiment.

More specifically, as shown in FIG. 3, an injector correction value is learned. In steps S41 to S43, the idle injection amount reference value after the air conditioner correction based on the state of the air conditioner 3 is calculated. When the air conditioner 3 is ON, an air conditioner pressure and an air conditioner correction value, calculated from the Table of Injection Amount Reference Values During Idle Learning and Air Conditioner Load Correction Values, are added to a base idle injection amount reference value (for example, an injection amount at idle 800 rpm). The Table of Injection Amount Reference Values During Idle Learning and Air Conditioner Load Correction Values is found in advance by tests or the like. Likewise, in step S44, an ACG correction value is calculated from a load signal "F terminal" of the ACG 4 and a Table of Injection Amount Reference During Idle Learning and ACG Correction Values, a water temperature correction value is calculated from the water temperature and a Table of Injection Amount Reference During Idle Learning and Water Temperature Correction Values, the calculated values are added to the idle injection amount reference value after the air conditioner correction, and an idle injection amount reference value is calculated. In step S45, the number of injections is determined based on the idle injection amount reference value so that the fuel injection amount of one injection becomes a very small amount Q (for example, 1 $mm^3$), and in step S46, the fuel of the idle injection amount reference value is injected by portions in the corresponding number of injections and the "injector correction value" is adjusted to obtain the target speed. In step S47, once the engine has been stabilized at the target speed (for example, 800 rpm), the "injector correction value" at this time is saved as an injector correction learning value at the time the fuel injection amount is a very small amount Q (for example, 1 mm$^3$).

Figure 1:
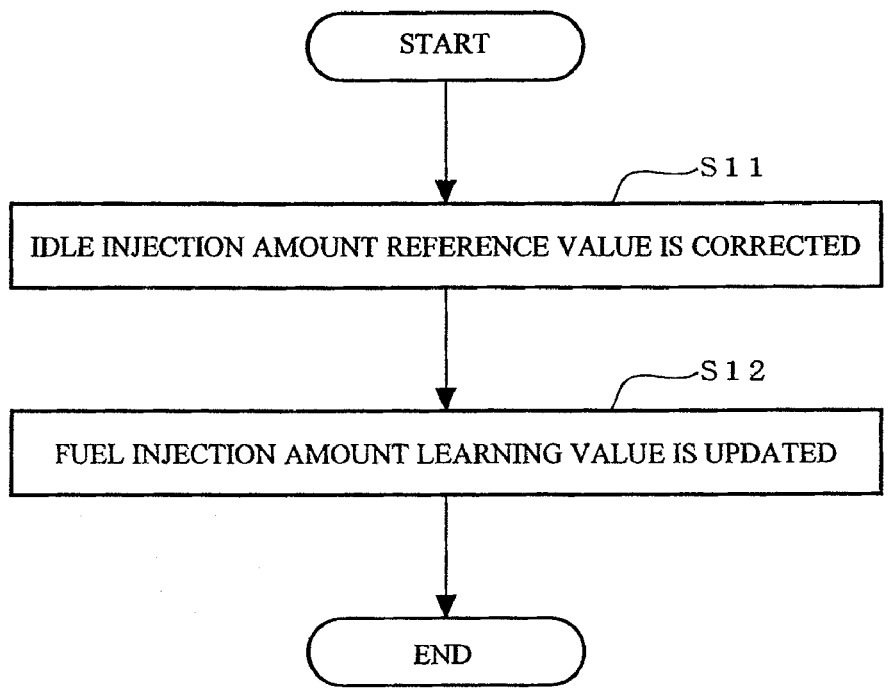
FIG. 1 is a flowchart for explaining the fuel injection amount learning control method of one embodiment of the present invention.

As shown in FIG. 1, when automatic learning is performed on the market or the like, with the learning correction function S11, and when the air conditioner 3 is ON, the correction value corresponding to the air conditioner pressure measured with the air conditioner load detection means 6 is read from the Table of Correction Values. The correction value that has been read out is added to the idle injection amount reference value during idle learning and the idle injection amount reference value is corrected. Then, learning S12 is performed with reference to the idle injection amount reference value corrected by the learning correction function. When the air conditioner 3 is OFF, a zero correction value is added and the idle injection amount reference value is not substantially corrected.

As a result, the injection amount learning can be correctly performed even in a state in which the air conditioner 3 is turned on. Therefore, the injection amount learning can be performed regardless of whether the air conditioner 3, which is the load of the engine 1, operates or not. As a result, it is not necessary to turn off the air conditioner 3 forcibly and functional deterioration of the air conditioner 3 can be avoided.

During learning of the present embodiment, the injection amount learning value is found by injecting the fuel corresponding to the idle injection amount reference value by portions in a plurality of injections. More specifically, the fuel is injected in a multistage manner so that the fuel injection amount of one injection is a predetermined very small injection amount (referred to hereinbelow as very small Q). For example, when the very small Q is 1 mm$^3$ and the idle injection amount reference value is 5 mm$^3$, the fuel is injected in five injections by 1 mm$^3$ per injection.

Further, in the present embodiment, when the idle injection amount reference value is corrected by the learning correction function from 5 mm$^3$ to 6 mm$^3$, the fuel is injected in six injections by 1 mm$^3$ per injection. In other words, in the present embodiment, the number of injections is determined with consideration for the correction value (correction amount) added by the load of the air conditioner 3 or the like in the learning correction function, so that the fuel injection amount of one injection becomes a very small Q (for example 1 mm$^3$).

By determining the number of injections in the above-described manner, it is possible to perform learning using the very small Q as an unit at all times.

As described hereinabove, with the fuel injection amount learning control method of the present embodiment, when the automatic learning is performed on the engine while in use by the consumer or the like, the learning can be performed regardless of whether the load of the engine 1 (air conditioner 3 or the like) operates or not, and functional deterioration of the air conditioner 3 can be avoided.

In other words, the learning has conventionally been performed under an assumption that the fuel is injected by the idle injection amount reference value (for example, 5 mm$^3$ (1 mm$^3$ is injected 5 times)) in a state in which the load of, for example, the air conditioner 3 is not turned on. The resultant problem is that the opportunities for learning are limited or functional deterioration of air conditioner 3 is induced. By contrast, in the present embodiment, the Table of Correction Values is found in advance by measuring the increment of fuel injection amount in a state in which the load of air conditioner 3 is turned on, the increment (for example, 1 mm$^3$) of fuel injection amount corresponding to the load created by the air conditioner 3 is derived from the Table of Correction Values during learning and taken as a correction value, and the idle injection amount reference value (for example, 5 mm$^3$) is corrected (idle injection amount reference value=5+1 mm$^3$ (1 mm$^3$ is injected six times)). As a result, the injection amount learning can be performed regardless of whether the air conditioner 3 operates or not.

Further, in the present embodiment, the correct injection amount learning corresponding to a very small fuel injection amount (very small Q) can be performed by conducting multistage injection (multi-injection) during learning.

Thus, in a very small Q region, generally there is no linear relationship between the injection amount of the injector and the electric conduction time to the injector. For this reason, when the injection amount learning value found during idle learning is simply subtracted in order to find the learning value corresponding to a very small Q that is less than the idle injection amount (this learning value is referred to hereinbelow as very small learning value), a correct very small learning value cannot be found. By contrast, in the present embodiment, a learning value of the very small Q region can be accurately found by performing multistage injection of the idle injection amount reference value by the very small Q during learning.

The present invention is not limited to the above-described embodiment, and a variety of modification examples or application examples thereof can be considered.

For example, in addition to the air conditioner 3, the ACG 4 can be considered as an auxiliary device. Thus, it is possible to read a load signal from the ACG 4 with respect to an electric load such as the light 8 and perform correction corresponding to this load. When the load (electric load) caused by the ACG 4 is corrected, first, a relationship between the load of ACG 4 and the increment of fuel injection amount is found, and a "Table of Injection Amount Reference Values During Idle Learning and Electric Load Correction Values" (referred to hereinbelow as Table of Correction Values) in which the load of ACG 4 serves as an axis (parameter) is created based on this relationship. Then, during learning, the correction value corresponding to a load signal (F terminal) of ACG 4 is read from the Table of Correction Values, and the correction value that has thus been read out is added to the idle injection amount reference value obtained during idle learning to correct the idle injection amount reference value by the learning correction function.

Another embodiment will be described below.

With the fuel injection amount learning control of the present embodiment, the idle injection amount reference value is corrected based on the environmental conditions such as a cooling water temperature of engine 1, and the method for measuring the correction value and the learning correction function are different from those of the above-described embodiment.

The fuel injection amount learning control process of the present embodiment has an injection amount reference value determination function of finding in advance a friction of the engine 1 and determining an idle injection amount reference value by taking the friction into account, and a learning function of finding a fuel injection amount learning value such that a speed of the engine 1 becomes a target idle speed with reference to the determined idle injection amount reference value, and further has a learning correction function of finding in advance a relationship between an environmental condition such as a cooling water temperature of the engine 1 and a variation in the fuel injection amount under the environmental condition relative to a reference environmental condition, deriving a variation in the fuel injection amount corresponding to this environmental condition from the relationship found in advance, and correcting the idle injection amount reference value by this variation.

When the environment correction is performed with respect to the cooling water temperature, first, a relationship between the variation of cooling water temperature with respect to a predetermined cooling water temperature and the increment or decrement (variation) of the fuel injection amount that is required to maintain the engine 1 at a target idle speed according to the variation is found by a test or the like. Then, a "Map of Fuel Amount Reference Value During Idle Learning and Environment Correction" (referred to hereinbelow as a Map of Environment Correction) in which the cooling water temperature serves as an axis (parameter) is produced based on this relationship. The Map of Environment Correction is stored, for example, in an ECU 2.

When the automatic learning is performed on the market or the like, a correction value corresponding to the cooling water temperature measured by a water temperature sensor 5 is read from the Map of Environment Correction during learning correction. The correction value that has been read out is added to the idle injection amount reference value obtained during idle learning and the idle injection amount reference value is corrected. Then, the learning is performed in the same manner as in the above-described embodiment with reference to the idle injection amount reference value that has been corrected by the learning correction.

In the present embodiment the learning of fuel injection amount can be performed correctly, without being affected by environmental conditions such as cooling water temperature.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A fuel injection amount learning control method having a learning function of finding in advance a friction of an internal combustion engine, determining an idle injection amount reference value by taking the friction into account, and finding a fuel injection amount learning value such that a speed of the internal combustion engine becomes a target idle speed with reference to the determined idle injection amount reference value, the method comprising a learning correction function of:
 finding in advance a relationship between a load created by an auxiliary device driven by the internal combustion engine and an increment of a fuel injection amount by the load of the auxiliary device relative to a state without a load; and
 correcting the idle injection amount reference value by the increment in the fuel injection amount corresponding to the load of the auxiliary device when the fuel injection amount learning value is found.

2. The fuel injection amount learning control method according to claim 1, the step of finding a fuel injection amount learning value includes the steps of injecting the fuel corresponding to the idle injection amount reference value by portions in a plurality of injections to find the injection amount learning value.

3. A fuel injection amount learning control method having a learning function of finding in advance a friction of an internal combustion engine, determining an idle injection amount reference value by taking the friction into account, and finding a fuel injection amount learning value such that a speed of the internal combustion engine becomes a target idle speed with reference to the determined idle injection amount reference value, the method comprising a learning correction function of:
 finding in advance a relationship between an environmental condition such as a cooling water temperature of the internal combustion engine and a variation in a fuel injection amount under the environmental condition relative to a reference environmental condition; and
 measuring the environmental condition and correcting the idle injection amount reference value by the variation in the fuel injection amount corresponding to the measured environmental condition when the fuel injection amount learning value is found.

4. The fuel injection amount learning control method according to claim 3, the step of finding a fuel injection amount learning value includes the steps of injecting the fuel corresponding to the idle injection amount reference value by portions in a plurality of injections to find the injection amount learning value.

5. A fuel injection amount learning control method having a learning function of finding a fuel injection amount learning value such that a speed of an internal combustion engine becomes a target idle speed with reference to a predetermined idle injection amount reference value, the method comprising a learning correction function of:
 correcting the idle injection amount reference value in accordance with a load of an auxiliary device driven by the internal combustion engine when the fuel injection amount learning value is found.

* * * * *